United States Patent [19]
Regehr

[11] 3,849,095
[45] Nov. 19, 1974

[54] LOUVER ARRANGEMENT FOR A LIQUID/GAS SEPARATOR

[76] Inventor: Ulrich Regehr, Susterfeld 65, 51 Aachen, Germany

[22] Filed: Sept. 25, 1972

[21] Appl. No.: 292,255

[30] Foreign Application Priority Data
Sept. 27, 1971 Germany............................ 2148079

[52] U.S. Cl.................................... 55/394, 55/440
[51] Int. Cl........................................... B01d 45/08
[58] Field of Search............................ 55/257–259, 55/440, 443, 423, 392, 394, 397

[56] References Cited
UNITED STATES PATENTS

| | | | |
|---|---|---|---|
| 1,616,802 | 2/1927 | Hosch................................. | 55/440 |
| 1,845,750 | 2/1932 | Hillery............................ | 55/440 X |
| 1,899,988 | 3/1933 | Ruemelin......................... | 55/440 X |
| 2,479,625 | 8/1949 | Kimmell............................ | 55/440 |
| 2,583,390 | 1/1952 | Paasche........................ | 55/440 X |
| 2,643,736 | 6/1953 | Smith.................................. | 55/440 |
| 2,911,011 | 11/1959 | Niehart.............................. | 55/440 |
| 2,976,954 | 3/1961 | Irwin............................. | 55/440 X |
| 3,358,580 | 12/1967 | Freese et al. ..................... | 55/440 X |
| 3,405,511 | 10/1968 | Halter et al.......................... | 55/440 |
| 3,751,886 | 8/1973 | Sokolowski...................... | 55/440 X |

FOREIGN PATENTS OR APPLICATIONS
828,547   12/1969   Canada............................... 55/440

Primary Examiner—Frank W. Lutter
Assistant Examiner—Vincent Gifford
Attorney, Agent, or Firm—Karl F. Ross; Herbert Dubno

[57] ABSTRACT

A louver assembly for a liquid/gas separator using inertial-deflection principles to separate entrained liquid from a gas stream, comprises an array of baffled plates which are geometrically identical, parallel and spaced apart. The louver plates extend between an inlet and an outlet in a manner such as to permit the flow of air in the general flow direction from the inlet to the outlet and are of generally undulate configuration with alternating convex and concave portions defining flow paths between the plates. At least one crest of each plate is provided over the length of the crest with a transverse web formed at its free end with an arcuate flange whereby the flange and web define a liquid-collection trough and constrict the flow path. The curvature of the flange may correspond to the curvature of the trough of the juxtaposed plate toward which the web extends.

3 Claims, 4 Drawing Figures

LOUVER ARRANGEMENT FOR A LIQUID/GAS SEPARATOR

FIELD OF THE INVENTION

My present invention relates to liquid/gas separators and, more particularly, to a baffle, deflector or louver blade or plate assembly interposed between the inlet and the outlet of a liquid trap to recover liquid from a gas traversing the flow paths defined between the plates or blades.

BACKGROUND OF THE INVENTION

In inertial-separation devices for the recovery of liquid from a gas stream, it is common practice to provide an assembly of louver, deflector or baffle plates or blades which intercept the fluid stream and cause the latter to undergo several changes of direction. Since liquid particles have greater mass than the accompanying gas particles, they tend to travel along straight-line paths upon such deflection and can be collected in so-called liquid-collection or liquid-interception troughs which are concave in the direction of flow of the fluid.

The trough-forming members of such plates are frequently provided at locations at which they constrict the flow path between the plates and the latter may have a generally undulate configuration with alternating crests and troughs, i.e. with successive concave and convex portions alternating with and merging into one another. For the most part, the trough-forming members are extensions of the plate surface and rise therefrom at small acute angles, having hook-shaped or similar free extremities.

It has been found that such systems are only limitedly satisfactory, especially when the gas velocity is small and the inertia of the liquid particles is correspondingly low. In such systems, droplet reflection may occur, together with or without droplet dispersion, reducing the quantity or proportion of liquid intercepted by the troughs. As a result, relatively large deflector assemlies must be provided at added cost and with increased pressure drop. In many cases, larger deflector assemblies cannot be used and hence the removal of liquid from the gas stream is unsatisfactorily small.

OBJECTS OF THE INVENTION

It is the principal object of the present invention to provide a baffle, deflector or louver blade or plate assembly whereby the aforementioned disadvantages can be obviated.

Another object of the invention is to provide a liquid/gas separator having an improved deflector arrangement which may be of smaller size for a given flow rate and volume of gas, which is more efficient in the removal of liquid for a given volume or flow rate, and which is especially effective for low flow velocities.

SUMMARY OF THE INVENTION

These objects and others which will become apparent hereinafter are attained, in accordance with the present invention, in a gas/liquid separator provided with a deflector, baffle or louver assembly between the inlet and the outlet which comprises a plurality of geometrically identical, generally parallel undulate baffles transversely spaced apart to define flow paths between them, the baffles having alternating crests and troughs or alternate convex and concave portions so that the crests of one baffle reach toward the troughs of a confronting baffle spaced therefrom. The crests and troughs thus run transversely to the general flow direction defined as a straight-line path between the inlet and the outlet. According to the principles of this invention, a web is provided on each of the baffles and extends transversely to the surface thereof over the length of at least one of the crests and has a free end extending into the respective flow path. An arcuate flange is provided on each web, each flange and the respective web defining a liquid-interception or liquid-collection trough.

When I describe a web which is transverse to the respective plate at its crest, I intend to thus limit the included angle between the web and the trough and opening toward the source of fluid or inlet (i.e. opposite to the flow direction) to an angle in excess of 45° and up to, say, 100°. Preferably the angle ranges between 60° and 90°.

It has been found to be advantageous to form a flange and web as T or J sections and to conform the curvature of the flange to the curvature of a trough toward which the web reaches and forming part of a juxtaposed baffle plate.

More particularly, the invention comprises an assembly of parallel deflector plates which define flow paths between them and are of sinusoidal or rounded zig-zigs, with corrugation crests and corrugation troughs transverse to the flow direction. The liquid-collection troughs, according to the invention, open opposite the flow direction and the entrie assembly may be provided with means for inducing a flow of liquid-entraining gas through the system and a collection reservoir therebelow. Each of the plates along at least one crest and preferably along two or more crests, is provided with a collection trough defined by webs extending transversely from the plate and arc-segment flanges which lie parallel to the floor of the trough of the juxtaposed plate in the direction in which the web reaches. The system has been found to be highly satisfactory for the recovery of liquid from gas stream operating at low temperatures.

To minimize the pressure drop in the system, I prefer to provide inlet portions of the plates which extend parallel to the aforementioned general direction of flow, i.e. parallel to the straight-line path between the inlet and the outlet and also parallel to the axis of the flow passage in which the baffle assembly is disposed. Alternatively, or in addition, the outlet sides of each of the plates may be extended parallel to the axis of the flow passage or even provided with corrugations of smaller height, e.g. half corrugations or half troughs. It has also been found to be advantageous to provide the discharge end of each plate with a hook-shaped collection trough but open counter to the direction of fluid flow and on the same side of the plate as the main liquid-collection trough most distal therefrom. We may also form the plate between a main collection trough and the inlet with a further liquid-collection trough of small height.

Best results have been found to be obtained with a plate having two crests and one trough, the crest most distal from the inlet being provided with a main liquid-collection trough while the crest proximal to the inlet is provided with a liquid-collection trough of reduced height, e.g. a conventional trough which rises at a shallow acute angle (less than 45°) from the surface of the plate.

The system of the present invention has been found to be highly advantageous for low-velocity gas/liquid separation and is characterized by a high degree of separation, low pressure losses and high separation efficiency. The reflected droplets and secondary droplets formed by a primary impact of droplets of liquid contained in the gas stream, are also collected. For example, with a fluid velocity of 2.0 meters/second, separation efficiencies of more than 99.9 percent can be attained. With conventional systems, the separation efficiency is much lower. Moreover, the other parameters of the system, e.g. the spectrum of the collected droplets, the flow velocity and the quantity of gas which can be treated, follow the usual rules with deflection-type separators in terms of the density ratios of the gas and liquid phases, the velocity of the gas phase etc.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
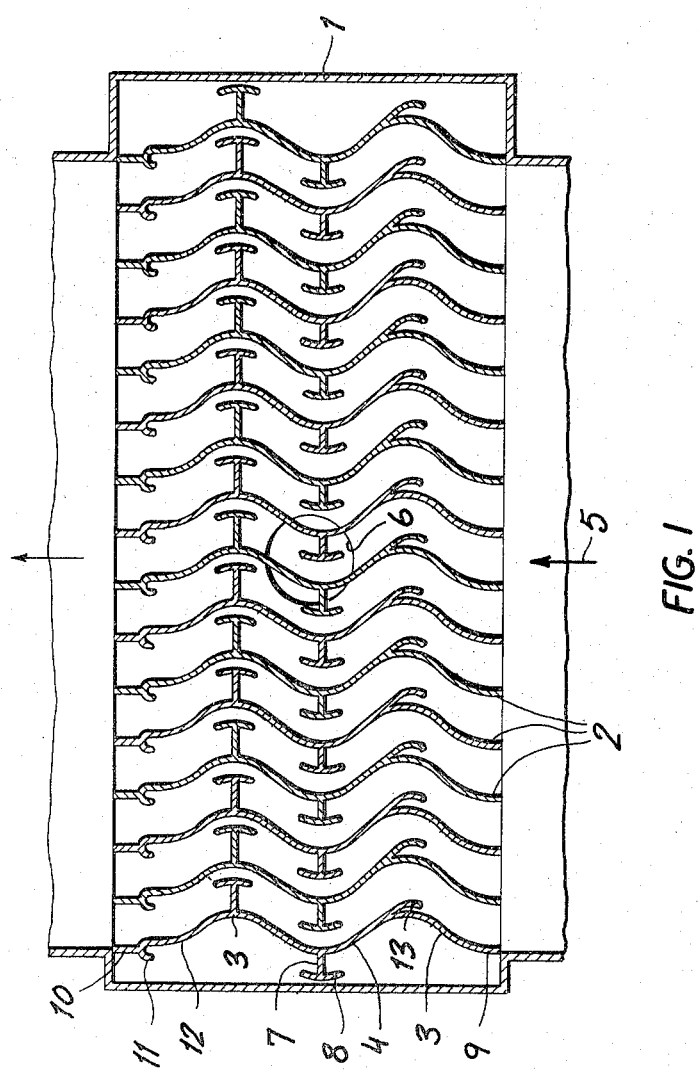
FIG. 1 is a cross-sectional view through a liquid/gas separator according to the invention.

In FIG. 1 I show a liquid/gas separator which comprises a flow passage 1 which may be received between a blower at its right-hand side and a vent for discharging gas at the left-hand side and in which a deflector blade assembly is provided.

The deflector blade assembly comprises a multiplicity of spaced-apart plates 2 of generally sinusoidal corrugated configuration, each plate having two acrcuate convex corrugations or crests 3 separated by an arcuate convex trough 4 and extending over the full length of the plate (perpendicular to the plane of the drawing in FIG. 1).

The crest and trough 4 extend transversely to the arrows 5 representing the main flow direction (parallel to the axis of the flow passage 1).

At the bottom of the flow passage 1, there is provided a floor having an outlet 6 at which the collected liquid is led away.

Figure 2:
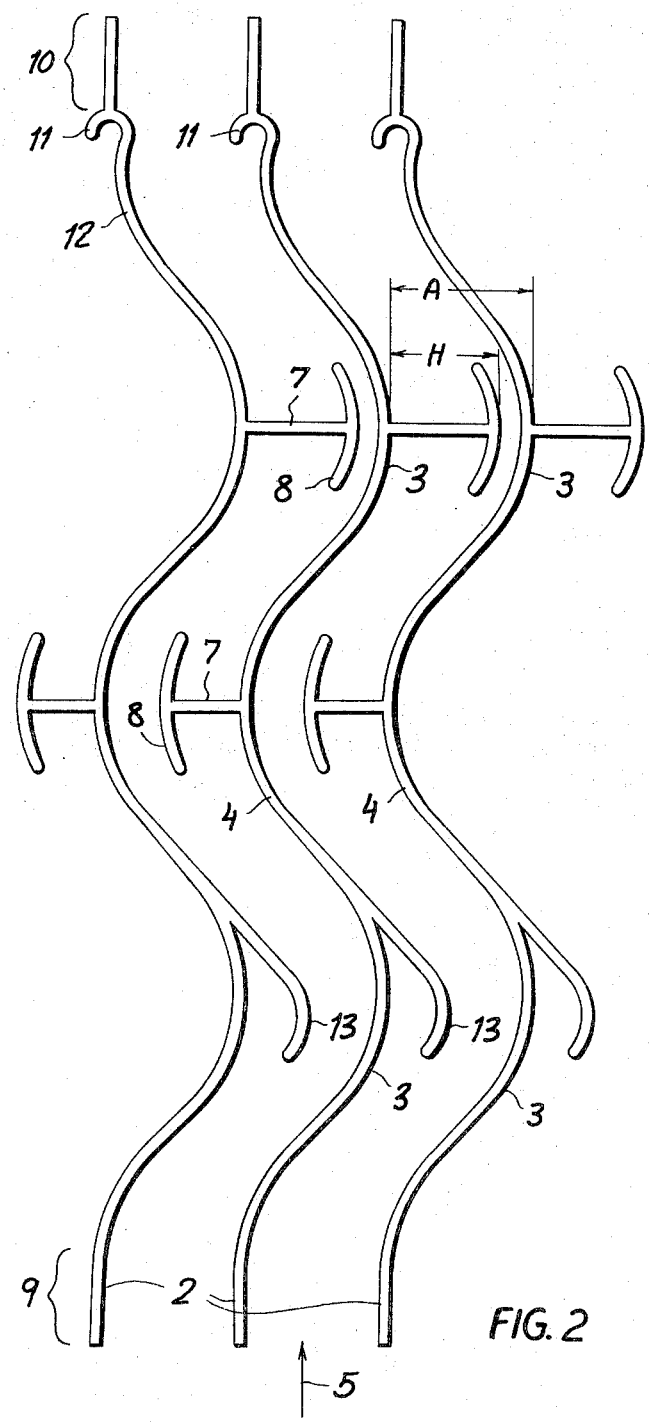
FIG. 2 is an enlarged end-elevational view of the system of FIG. 1.

From FIGS. 1 and 2, it will be apparent that each plate is provided along its crest 3 remote from its inlet side (bottom of FIG. 1) with a main liquid-collection trough 7, 8 consisting of a web 7 rising perpendicularly from the plate, and a flange 8 forming a T-section with the web 7 and constituting an arc segment. The angle included between the web 7 and the plate is thus 90°.

The webs 7 and 8 rise to a height H which is a major fraction of the width A of the flow passage traversed by the fluid. The term "major fraction" is used herein to designate a height H which is greater than 0.5 A and preferably ranges between 0.6 A and 0.9 A. At the inlet sides (FIG. 2) each plate is provided with inlet stretches 9 which lie parallel to the axis of the flow passage and to one another. The crests 3 proximal to the inlet are shrouded by overhanging J-shaped trough-forming members 13 which include, at their junctions with the plate, angles of less than 45° open counter to the direction of flow of the fluid.

At the discharge sides of the plates, corrugations 12 are provided of a more shallow configuration, i.e. a height at most equal to half the height of the corrugations 3. The trough 4 of each plate, of course, forms a crest in the direction of the flow passage opposite the flow passage into which members 7, 8 and 13, previously described, extend. This crest is provided with a T-section main liquid-collection trough as described.

Figure 4:
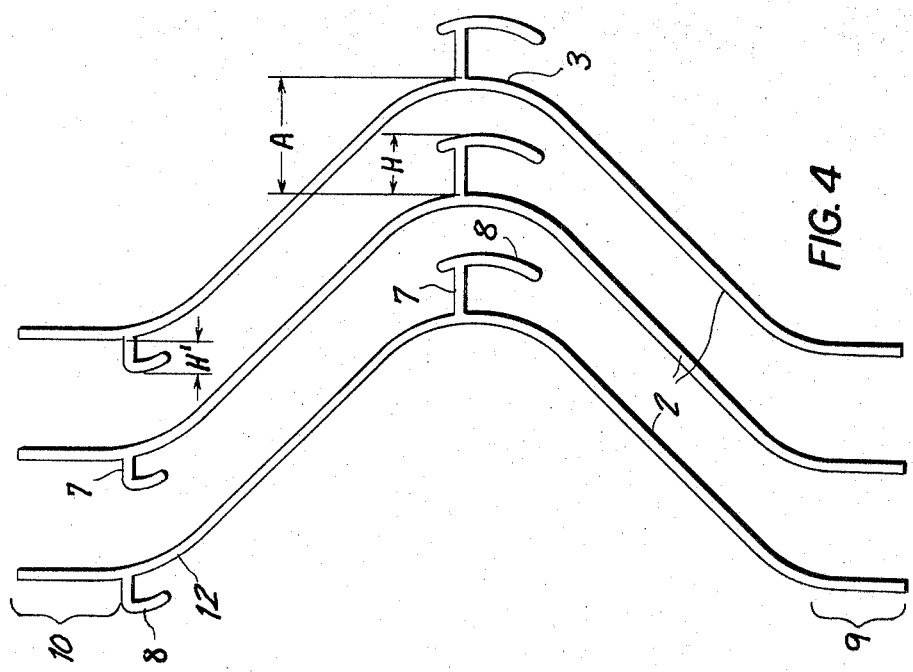
FIG. 4 is yet another end-elevational view illustrating the liquid/gas separator according to the invention.
Figure 3:
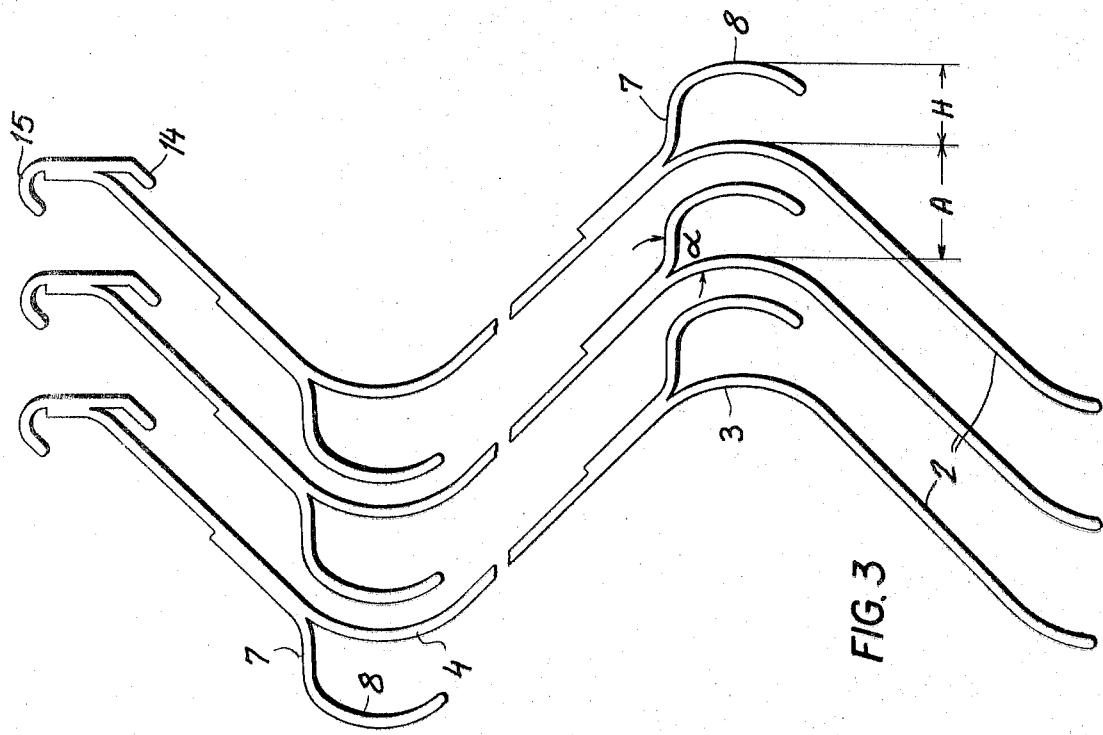
FIG. 3 is a view corresponding to FIG. 2 illustrating another embodiment of the invention.

From FIG. 3 it will be apparent that the members 7, 8 forming the liquid-collection trough may also be of generally J-cross-section with the web 7 cantilevering the flange 8. Here again the web 7 rises from the plate at an included angle in excess of 45° as represented generally at $\alpha$. The preferred construction of FIGS. 1 and 2 comprises a pair of crests 3, a full-height trough 4, a half-height trough 12 and a hook portion 11 turned to open opposite the flow direction and located on the same side as the trough 4 of the plate. It has been found that the energy expenditure in the liquid/gas separation can be maintained low by providing a free cross-section (A − H) which is reduced stepwise in the flow direction from stage to stage. In the modification of FIG. 4, the flange 8 is fixed at one end to the web 7 which rises from the crest 3. This small-height stage is effective where most of the liquid travels along the deflector plates (see FIG. 4), where the height is represented at H'. The discharge side may be provided with stretches 10 parallel to the general flow direction and collecting troughs 14 and 15 may also be formed at these ends to intercept liquid traveling along the surface of the plates.

I CLAIM:

1. A deflection assembly for the inertial separation of a liquid from a gas comprising means forming a flow passage having a general direction of fluid flow between an inlet and an outlet; an array of geometrically identical parallel deflector plates of generally undulate configuration and substantially sinusoidal cross-section mounted in said passage and transversely spaced apart by a distance A between corresponding points of successive plates to define respective flow paths between them, each plate having a side turned toward said inlet and extending generally parallel to said flow direction, each of said plates comprising a plurality of corrugation crests and a plurality of corrugation troughs; a respective web extending transversely from each crest of each of said plates toward a confronting other plate and into a trough thereof thereby obstructing the flow path therebetween; and an arcuate cylinder-segment flange at an end of each of said webs remote from the plate and defining therewith a respective liquid collection trough open opposite to said flow direction, each segment having a curvature corresponding substantially to that of the trough in which it lies, said webs, flanges and crests running transversely to said flow direction, said flanges each lying at a height H from the plate upon which they are mounted and H is greater than 0.5 A, the difference between the heights of said liquid collection troughs and the width of said flow passage decreasing from liquid-collection trough to liquid-collection trough in said direction.

2. The assembly defined in claim 1 wherein each of said flanges is connected at an end to the respective web and the liquid-collection troughs have generally J-shaped cross-sections.

3. The assembly defined in claim 1 wherein each of said liquid-collection troughs are generally of a T-shaped cross-section.

* * * * *